US006786492B2

(12) United States Patent
Brandenburger

(10) Patent No.: US 6,786,492 B2
(45) Date of Patent: Sep. 7, 2004

(54) METHOD AND DEVICE FOR CONTROLLING THE SUSPENSION PERFORMANCE IN VEHICLES HAVING HYDROPNEUMATIC SUSPENSION DEVICES AND HIGHLY VARIABLE AXLE-LOAD RATIOS

(75) Inventor: Walter Brandenburger, Neuss (DE)

(73) Assignee: Carl Freudenberg KG, Weinheim (DE)

(*) Notice: Subject to any disclaimer, the term of this patent is extended or adjusted under 35 U.S.C. 154(b) by 115 days.

(21) Appl. No.: 10/075,794

(22) Filed: Feb. 13, 2002

(65) Prior Publication Data

US 2002/0171209 A1 Nov. 21, 2002

(30) Foreign Application Priority Data

Feb. 15, 2001 (DE) ......................................... 101 07 631

(51) Int. Cl.$^7$ .............................................. B60G 17/00
(52) U.S. Cl. ................. 280/5.519; 280/6.157; 280/6.159; 280/124.159
(58) Field of Search ......................... 280/5.519, 5.515, 280/5.504, 6.157, 6.159, 124.158, 124.159, 754, FOR 165, FOR 166, FOR 171

(56) References Cited

U.S. PATENT DOCUMENTS 5,338,010 A * 8/1994 Haupt

FOREIGN PATENT DOCUMENTS

| DE | 41 20 758 | | 1/1992 | |
|----|-----------|---|--------|---|
| DE | 4127801   | * | 2/1993 | ........ 280/FOR 165 |
| DE | 42 42 448 | | 3/1994 | |
| DE | 197 19 075 | | 11/1998 | |
| DE | 197 19 076 | | 11/1998 | |
| DE | 197 19 077 | | 11/1998 | |

* cited by examiner

Primary Examiner—Eric Culbreth
(74) Attorney, Agent, or Firm—Kenyon & Kenyon

(57) ABSTRACT

A method of controlling suspension performance in vehicles having hydropneumatic suspension devices between suspended masses and unsuspended masses and extremely variable axle load ratios, in particular on vehicles in which the front axle is subjected to a low, medium or high static load range, depending on the application of the vehicle, and the suspension device has double-action hydraulic cylinders between the suspended masses and unsuspended masses, their pressure spaces being connectable to a pump over pressure lines, a pressure-regulating valve being installed in the pressure line to the annular spaces, the pressure-regulating valve constantly correcting the pressure in the annular spaces to the pressure in the piston spaces in a predefined ratio, with the pressure ($P_R$) in the annular spaces (7, 8) of the spring cylinders (1, 2) being increased in the low load range (n) on the front axle.

20 Claims, 4 Drawing Sheets

METHOD AND DEVICE FOR CONTROLLING THE SUSPENSION PERFORMANCE IN VEHICLES HAVING HYDROPNEUMATIC SUSPENSION DEVICES AND HIGHLY VARIABLE AXLE-LOAD RATIOS

The present invention relates to a method and a device for controlling suspension performance in vehicles having hydropneumatic suspension devices and extremely variable axle load ratios, in particular on vehicles in which the front axle is subjected to a low, medium or high static load range, depending on the application of the vehicle, and the suspension device has double-action hydraulic cylinders between the suspended masses and unsuspended masses, the pressure lines of the cylinders being connectable to a pump, a pressure-regulating valve being installed in the pressure line to the annular spaces, the pressure-regulating valve constantly correcting the pressure in the annular spaces to a predefined pressure level.

BACKGROUND INFORMATION

German Patent Application 41 20 758 A1 describes a hydropneumatic suspension for vehicles having high axle-load differences, using double-action hydraulic cylinders whose cylinder spaces are connected to a first accumulator and whose annular spaces on the piston rod end are connected to a second accumulator, where a level-regulating valve regulates the level and a pressure-controlled valve steadily regulates a predetermined pressure ratio between the pressures of the first and second accumulators as a function of the load of the hydropneumatic actuators. The pressure-controlled valve is actuated by the pressure in the pressure line to the cylinder spaces as well as by the pressure in the pressure line to the annular spaces. Steady regulation is achieved as a function of the load of the hydropneumatic actuators. The annular space pressure is regulated as a function of load.

A simpler, more economical embodiment is described in German Patent 42 42 448 C1, the advantage being that it is possible to use load-sensing pumps. After changes in load and subsequent measures regulating the level up or down, static load changes are corrected. A pressure-regulating valve is used, maintaining a constant pressure level in the annular space spring circuit. With medium loads, however, the suspension becomes hard and occasionally uncomfortable.

An improvement in this situation with regard to comfort is achieved with the device according to German Patent Application 197 19 077 A1 by using a load-adjusted two-stage pressure-regulating valve as the pressure-regulating valve. This permits better adaptation of the suspension to the load cases. A change in the annular space pressure between a lower limit and an upper limit as a function of load is possible.

German Patent Application 197 19 076 A1 describes a device which allows an increase in load ratios without any increased stress on the parts and also improves driving comfort in the sense of a softer suspension. The regulating spring and the positioning spring of the pressure-regulating valve are coordinated to yield a load-dependent change in the annular space pressure which results in an increase in the spring constant at a low axle load with the possibility of making the spring constant softer in the medium load range to improve comfort. The functional advantages have been proven in experiments. However, with this type of device, the restricted manufacturing tolerances required for reproducibility of function and the unfavorable design size are unsatisfactory.

The speed of the pressure adjustment has proven to be inadequate for permanent suspension use.

DESCRIPTION OF THE INVENTION

Therefore, the object of the present invention is to create a control system in which the tolerance requirements are less stringent for economic manufacturing, a low installation volume is made possible and the required rapid pressure adjustment is implemented. The low load range of the front axle of the vehicle is understood to be the range of the suspended axle load which occurs when the vehicle is provided with a load such as a plow on its rear end. The high load range occurs when a loader or a similar device is attached to the front end of the vehicle. The medium load range occurs when there is no load on the vehicle.

Experiments have shown that a comfortable suspension design in the medium load state with a reduced axle load due to devices attached to the rear end, especially with the center of gravity projecting far outward, is associated with unacceptable vibration against the end stops, so that either an additional shock absorber function must be installed or the spring constant must be harder.

The object formulated here according to one exemplary embodiment of the invention is achieved by increasing the pressure in the annular spaces of the spring cylinders in the low load range on the front axle. In the medium load range, the pressure in the annular space is reduced for the purpose of increasing comfort, and in the low load range, the spring constant is made harder by increasing the annular space pressure.

In conjunction with the accumulator design, the control system may be coordinated so that the pressure in the annular spaces may remain constant for the medium and high load cases. On the other hand, however, it is also possible to increase the annular space pressure even with a higher load on the front axle.

The increase in annular space pressure may be adjusted to various values. These values are to be coordinated with the tractor size and the respective load states and should be on the order of magnitude of 20–40 bar in conjunction with the ring area of the spring cylinder.

The accumulator design may be coordinated so that the pressure value in the annular spaces may remain constant in both medium and high load ranges.

The device for implementing this method includes the use of a pilot valve which is controlled by the inlet pressure to the cylinder spaces and by the outlet pressure.

The pressure-regulating valve equipped with a servo-piston regulates an upper and lower pressure value. The pressure to be regulated is determined by the precontrol.

A 3/2-way valve may also be used as the pilot valve and is to be controlled electrically by a pressure sensor in the cylinder spring circuit. Another reversing function is to be provided in the case of the required hardening of the spring constant in the high load range.

The advantages of the present invention are achieved with a soft initial basic setting in the spring design which yields a good driving comfort in the medium load range and a harder coordination in the low load range, thus avoiding the problems of vibration against the end stops.

BRIEF DESCRIPTION OF THE DRAWING

The present invention is illustrated in greater detail on the basis of the accompanying drawing, which shows.

DETAILED DESCRIPTION OF THE EMBODIMENTS

Figure 1:
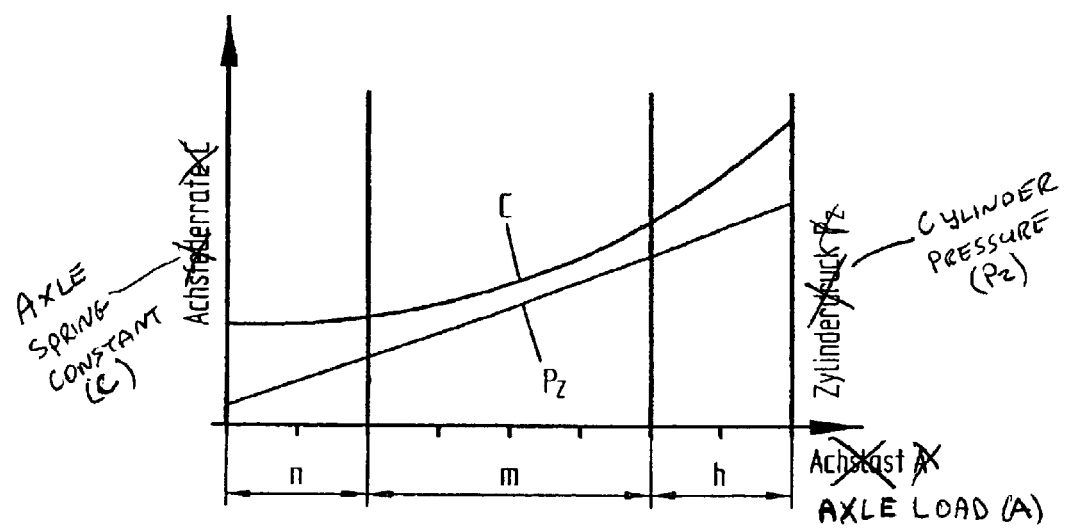
FIG. 1 a suspension diagram in which the axle spring constant and the cylinder pressure are plotted relative to the axle load, FIG. 2 the suspension diagram showing an increased annular space pressure in the low load range, FIG. 3 the suspension diagram showing an increased annular space pressure in the low and high load ranges, FIG. 4 a schematic diagram for implementation of the change in annular space pressure.

FIG. 1 shows axle spring constant C and cylinder pressure $P_Z$ relative to axle load A on the front axle of a vehicle at a constant annular space pressure $P_R$. Curve C shows the curve of axle spring constant C and curve $P_Z$ shows the curve of the cylinder pressure over axle load A. Axle load A is divided into a low load range n, a medium load range m and a high load range h. Low load range n is when the vehicle is provided with a load on its rear end. This may be a plow, for example, in the case of a tractor. Then the load is relieved on the front axle suspension, which is thus in low load range n. A high axle load and thus a high load range h of the front axle suspension occur when a loader or the like is mounted on the front part of the tractor. Then the front axle has its highest axle load. Medium load range m of the axle load occurs when the vehicle is not loaded with devices on either the front or rear end. The load limits are fixed in the design and are coordinated with the type of tractor and the selected attachments.

With known hydropneumatic suspensions having a constant annular space pressure, the required spring excursions are achieved on the suspension devices for load ranges of high and low axle loads and thus good driving comfort is achieved. In the medium axle load range, however, mainly short spring excursions occur, resulting in unsatisfactory driving comfort. The driving performance of the hydropneumatic suspension has the effect of being uncomfortable and hard in the medium load range.

Axle spring constant C depends on the selected gas pretension and the volume of the hydraulic accumulator. If axle spring constant C is set for high driving comfort for medium load case m, this setting will always result in the axle striking the end stops to an unacceptable extent in low load range n in the absence of additional shock absorber functions.

This may be avoided by making the axle spring constant harder by increasing the annular space pressure in the low load range.

Figure 2:
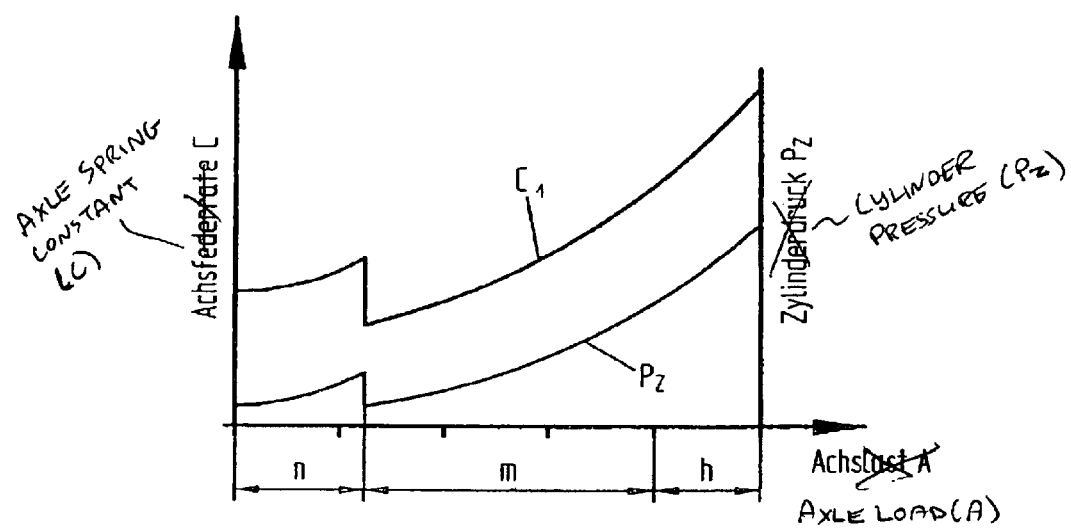
Figure 3:
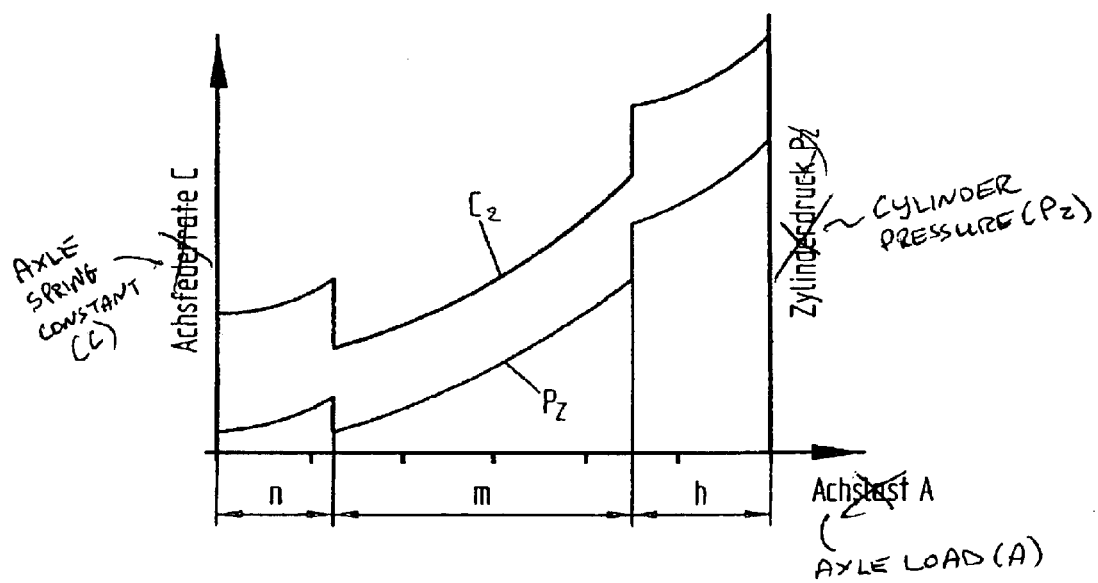

FIGS. 2 and 3 illustrate the effect of an increase in annular space pressure in the curve of axle spring constant C and cylinder pressure $P_Z$. In FIG. 2 the annular space pressure increase occurs only in low load range n. FIG. 3 shows the diagram for the case when hardening of the spring constant is required even in high load range h, resulting in curves $C_1$ and $C_2$. It is found that high driving comfort in medium load range m is achieved with both embodiments. The idea on which the present invention is based is applicable in principle with all vehicles equipped with hydropneumatic suspension devices and in which large axle load ratios occur, depending on their application.

Driving experiments have shown that the effect of adjusting axle spring constant C to the respective load states may be optimized by an accelerated change in annular space pressure. This is especially true of suspension systems without suspension blocking.

As an expanded feature of the present invention, the pilot pressure-regulating valve is for this reason equipped with an external reactive pressure pickup which permits compensation of the internal flow-through resistance in the case of small control blocks and thus results in the required accelerated pressure changes in the annular space.

Figure 4:
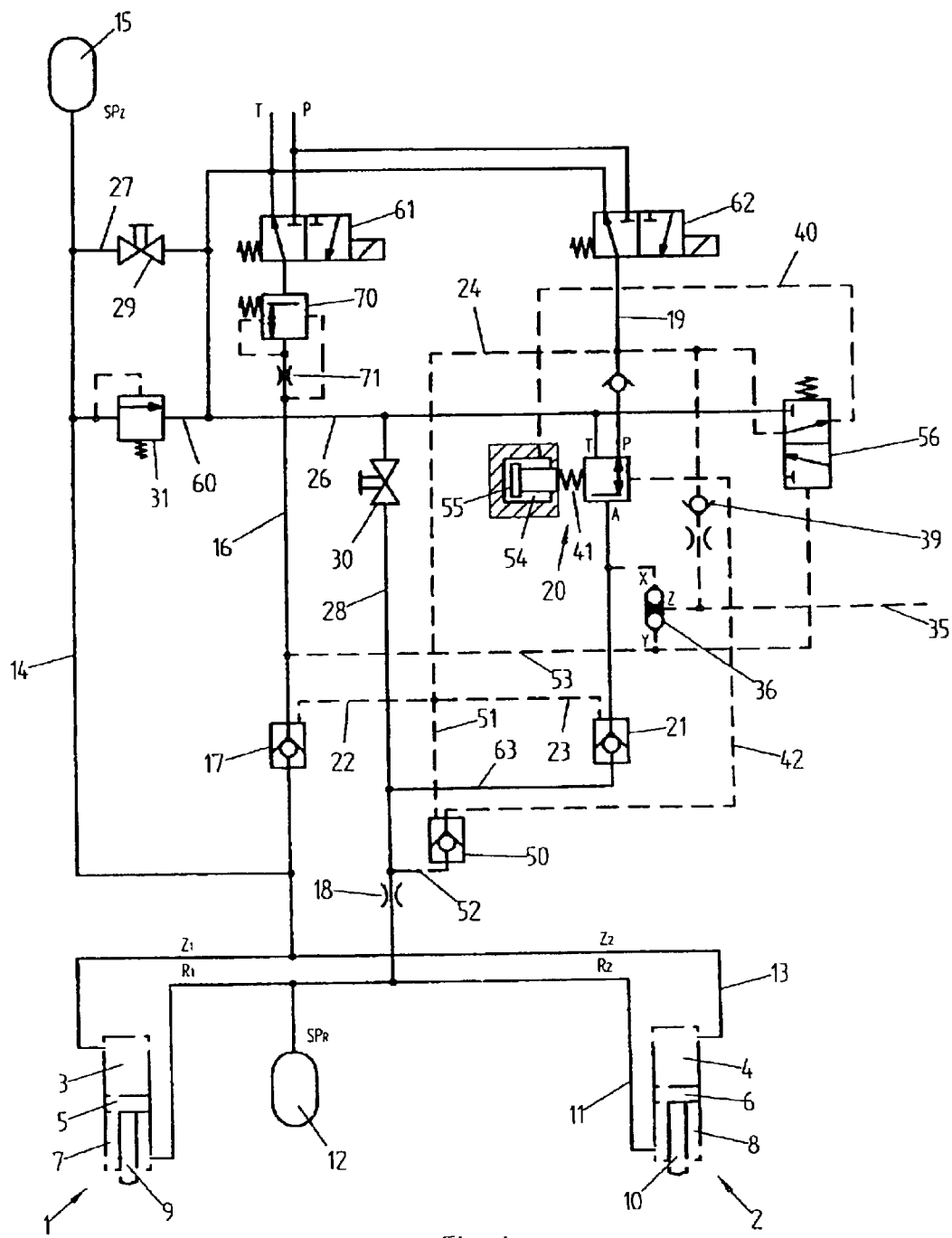

FIG. 4 illustrates a schematic diagram for a tractor vehicle in which the suspension device has double-action hydraulic cylinders whose pressure spaces are connectable to a load-sensing pump.

The schematic diagram illustrated in FIG. 4 shows spring cylinders 1 and 2 which are situated between the suspended masses and unsuspended masses (not shown here). Spring cylinders 1 and 2 have piston spaces 3 and 4 which are separated from annular spaces 7 and 8 by pistons 5 and 6. Piston rods 9 and 10 are guided outward out of spring cylinders 1 and 2 with a seal.

Both annular spaces 7 and 8 are connected to each other by connecting line 11 and are connected to hydraulic accumulator 12. A second connecting line 13 connects piston spaces 3 and 4. Connecting line 13 is connected to hydraulic accumulator 15 by a line 14. Inlet line 16, in which a deblockable non-return valve 17 is installed, opens into line 14. Inlet line 63, connected to line 28 in which throttle 18 is installed, opens into connecting line 11 and also has a deblockable non-return valve 21.

Both non-return valves 17 and 21 open automatically in the direction of piston spaces 3 and 4 or annular spaces 7 and 8. They may be deblocked for liquid flow in the opposite direction via control line 24 and lines 22 and 23 branching off from the control line. Control line 24 is connected to inlet line 19. Pressure-regulating valve 20 is inserted into inlet line 19, having pressure connection P, outlet connection T and pressure connection A for the regulated pressure. Outlet line 26 is connected to outlet connection T of pressure-regulating valve 20 and leads to a storage container. Line 14 and inlet line 63 are connected to outlet line 26 over drain lines 27 and 28, in which cutoff valves 29 and 30 are installed. Line 14 and outlet line 26 are connected by an intermediate line 60 in which a pressure-limiting valve 31 is installed. Inlet lines 16 and 19 are each connected to a solenoid valve 61 and 62 which is provided with pressure connections P and outlet connections T. Valves 61 and 62 are provided for the level-regulating function, connecting inlet lines 16 and 19 to a load-sensing pump or a storage container, depending on the level situation of the vehicle. Lines 16 and 19 are connected to outlet connection T in the circuit illustrated in the schematic diagram. This is the neutral position.

Valves 61 and 62, which function as level regulating valves, are currentless and are in their neutral positions. Both inlet lines 16 and 19 are connected to outlet T, as illustrated in the schematic diagram. Non-return valves 17 and 21 are then not able to be deblocked due to the lack of a control pressure. They are closed, and piston spaces 3 and 4 as well as annular spaces 7 and 8 are separated from any inlet or outlet lines. However, the connections to hydraulic accumulators 12 and 15 remain, so that the suspension of the vehicle is guaranteed. Due to the pressureless state of inlet line 19, control line 35 to the load-sensing pump also becomes pressureless because it is able to be relieved via non-return valve 39 into inlet line 24. The load-sensing pump may then be operated in standby mode with a comparatively low power requirement.

As soon as the static load increases, piston rods 9 and 10 push pistons 5 and 6 upward, so that piston spaces 3 and 4 become smaller and hydraulic oil is forced into accumulator 15 with an increase in pressure, while annular spaces 7 and 8 increase in size and hydraulic oil is conveyed out of accumulator 12 with a reduction in pressure.

The change in distance is picked up by a level sensor whose signal is converted to an electronically filtered control signal, energizes solenoid valves 61 and 62 and thus switches them to the function of regulating the level up. In this switch position, inlet lines 16 and 19 are connected to pump pressure P, the pressure in control line 24 is also increased over line 19, and non-return valves 17, 21 and 50 are deblocked.

The pressures on non-return valves 17 and 21 are sent to shuttle valve 36 which supplies the highest pressure to control line 35 so that the load-sensing pump may be stabilized at the required pressure level.

Hydraulic medium flows into pressure line 14, increasing the pressure in accumulator 15 to the required static pressure, and then flows over line 13 into cylinder spaces 3 and 4 until the level is reached and valves 61 and 62 switch back to their neutral position.

During the regulation procedure, the pressure in annular spaces 7 and 8 and in pressure accumulator 12 is regulated by two-stage pressure-regulating valve 20 at a load-dependent pressure level which is predetermined by pilot valve 56. The Pressure-regulating valve (20) constantly corrects the pressure in the annular spaces (7, 8) to the pressure in the piston spaces (3, 4) of the cylinders in a predefined ratio. Pilot valve 56 is subjected to the cylinder pressure from pressure connection 16 over control line 53 and relays the pressure level to be regulated to pressure-regulating valve 20 over control line 40 in such a manner that the prevailing pressure in pilot valve 56 acts against a spring and as a function of pressure displaces a piston connecting control line 40 to outlet line 26 in the medium and high pressure levels in load cases m and h and thus switching to pressureless, and connecting line 40 to pressure line 63 in the low level, so that in low load range n, hydraulic oil flows to control space 54 and servo-piston 55 applies a higher prestress to regulating spring 41 in regulating valve 20 and thus a higher annular space pressure level is established to increase the spring constant.

The control pressure for the regulating function of pressure-regulating valve 20 is picked up externally in branch 52 between non-return valve 21 and a throttle 18 inserted upstream from connecting line 11 to coordinate the regulating time, and it is connected to control line 42 over deblockable non-return valve 50 whose control line 51 is connected to control line 24 for deblocking.

In the case of a reduction in load on spring cylinders 1 and 2, there is an increase in the size of piston spaces 3 and 4 and a reduction in size of annular spaces 7 and 8. Valve 62 is energized and switches to the position in which the level is regulated down, which ensures that non-return valves 17 and 21 are deblocked or remain deblocked. Then hydraulic oil may flow out through deblocked non-return valve 17 through line 16, and hydraulic medium for regulating the pressure level may flow through deblockable non-return valve 21 until reaching the level position again.

The annular space pressure ($P_R$) may be switched in two pressure stages having a difference of up to 50 bar as a function of the pressure ($P_Z$) in the piston spaces (3, 4).

In another embodiment of the present invention, it is possible to design pilot valve 56 with a double reversal so that even in high load range h, control line 40 is connected to pressure line 19 to achieve a harder spring constant, and the pressure level in the annular space is increased. In such an embodiment, pilot valve 56 may be designed as a three-position valve.

Pressure regulator 70 working together with throttle 71 in pressure line 16, as disclosed by German Patent Application 197 190 75, regulates the amount of incoming and outgoing flow of hydraulic medium to and from the cylinder spring circuit which results from the connection between cylinder spaces 3 and 4 and spring accumulator 15.

What is claimed is:

1. A method of controlling suspension performance in a vehicle having a hydropneumatic suspension device between suspended and unsuspended masses and variable axle load ratios, wherein the suspension device has double-action hydraulic cylinders (1, 2) between the suspended and unsuspended masses, the cylinders (1, 2) having pressure chambers connectable to a pump over pressure lines, with a pressure-regulating valve (20) being installed in a pressure line to annular spaces (7, 8) of the pressure chambers of the cylinders (1, 2), comprising: the pressure-regulating valve (20) constantly correcting the pressure in the annular spaces (7, 8) to the pressure in piston spaces (3, 4) of the pressure chambers of the cylinders (1, 2) in a predefined ratio, wherein the pressure ($P_R$) in the annular spaces (7, 8) of the cylinders (1, 2) is increased in a low load range (n) on a front axle of the vehicle.

2. The method according to claim 1, wherein the pressure ($P_R$) in the annular spaces (7, 8) is also increased in a high load range (h) of the front axle.

3. The method according to claim 1, wherein the annular space pressure ($P_R$) is switched in two pressure stages having a difference of up to 50 bar as a function of a pressure ($P_Z$) in the piston spaces (3, 4).

4. A hydropneumatic suspension device for vehicles having variable load conditions and variable axle load ratios, comprising: double-action hydraulic cylinders (1, 2) having pressure chambers connectable to a pump over pressure lines, the cylinders (1, 2) which have load-carrying piston spaces (3, 4) and pressure-loaded annular spaces (7,8) surrounding a piston rod with a seal which comprise the pressure chambers situated between suspended and unsuspended masses, the piston spaces (3, 4) being connected to a first hydraulic accumulator (15) and the annular spaces (7, 8) being connected to a second hydraulic accumulator (12), and a pressure-regulating valve (20) being provided, which is inserted into a pressure line (19) to the annular spaces (7, 8), wherein the pressure-regulating valve (20) is controlled by a pilot valve (56) which is actuated by an inlet pressure ($P_Z$) to the piston spaces (3, 4) and which switches the pressure-regulating valve (20) to a higher regulating stage when the pressure drops below a predetermined inlet pressure ($P_Z$) in an inlet line (16) to the piston spaces (3, 4).

5. The device according to claim 4, wherein a control line (42) is provided with a deblockable non-return valve (50).

6. The device according to claim 4, wherein a throttle (18) is inserted between a connection (52) of a control line (42) to the inlet line (16) and a connecting line (11) of the annular spaces (7, 8).

7. The device according to claim 4, wherein a deblocking control line (51) of a non-return valve (50) is connected to a control line (24) of non-return valves (17, 21) of the inlet line (16) and an inlet line (19).

8. The device according to claim 4, wherein the pilot valve (56), designed as a valve having a double reversal, switches the pressure-regulating valve (20) from the inlet pressure ($P_Z$) to a higher regulating stage at a low pressure level and at a high pressure level.

9. The device according to claim 8, wherein the pilot valve (56) is a 3/2-way solenoid valve which is switched by a pressure sensor in the inlet pressure ($P_Z$).

10. The device according to claim 8, wherein a control line (42) for a regulating spring (41) of the pressure-regulating valve (20) is connected to an inlet line (63) leading to the annular spaces (7, 8) between a non-return valve (21) and the annular spaces (7, 8).

11. The device according to claim 8, wherein a control line (42) is provided with a deblockable non-return valve (50).

12. The device according to claim 8, wherein a throttle (18) is inserted between a connection (52) of the control line (42) to the inlet line (60) and a connecting line (11) of the annular spaces (7, 8).

13. The device according to claim 8, wherein a deblocking control line (51) of a non-return valve (50) is connected to a control line (24) of non-return valves (17, 21) of the inlet line (16) and an inlet line (19).

14. The device according to claim 4, wherein the pilot valve (56) is a 3/2-way solenoid valve which is switched by a pressure sensor in the inlet pressure ($P_Z$).

15. The device according to claim 14, wherein a control line (42) for a regulating spring (41) of the pressure-regulating valve (20) is connected to an inlet line (63) leading to the annular spaces (7, 8) between a non-return valve (21) and the annular spaces (7, 8).

16. The device according to claim 14, wherein a control line (42) is provided with a deblockable non-return valve (50).

17. The device according to claim 14, wherein a throttle (18) is inserted between a connection (52) of the control line (42) to the inlet line (60) and a connecting line (11) of the annular spaces (7, 8).

18. The device according to claim 4, wherein a control line (42) for a regulating spring (41) of the pressure-regulating valve (20) is connected to an inlet line (63) leading to the annular spaces (7, 8) between a non-return valve (21) and the annular spaces (7, 8).

19. The device according to claim 18, wherein a control line (42) is provided with a deblockable non-return valve (50).

20. The device according to claim 18, wherein a throttle (18) is inserted between a connection (52) of the control line (42) to the inlet line (63) and a connecting line (11) of the annular spaces (7, 8).

* * * * *